June 6, 1967     A. OGILVIE ET AL     3,323,868
MANUFACTURE OF HYDROGEN PEROXIDE
Filed Dec. 14, 1962
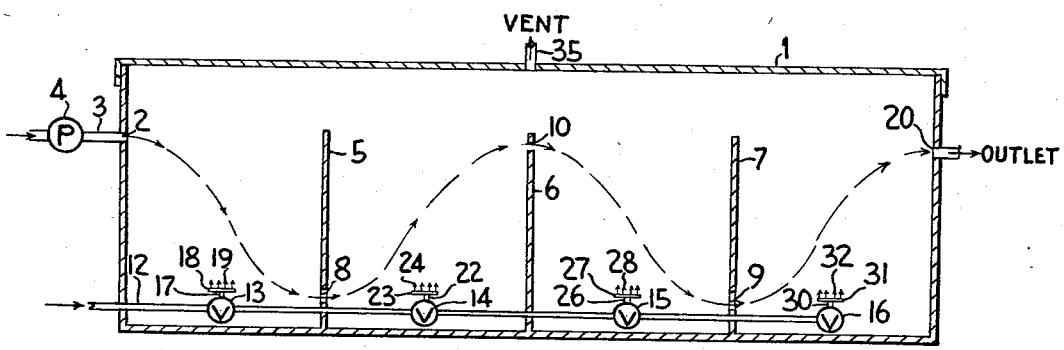
INVENTORS
ALEXANDER OGILVIE and
BERNARD LAURENCE
BY
Oscar L Spencer
ATTORNEY ent Office 3,323,868
Patented June 6, 1967

3,323,868
MANUFACTURE OF HYDROGEN PEROXIDE
Alexander Ogilvie, Dunstable, England, and Bernard Laurence, Coleraine, County Derry, Northern Ireland, assignors to Laporte Chemicals Limited, Luton, Bedfordshire, England, a British company
Filed Dec. 14, 1962, Ser. No. 244,724
Claims priority, application Great Britain, Dec. 14, 1961, 44,837/61
5 Claims. (Cl. 23—207)

The present invention relates to a process and apparatus for conducting gas liquid reactions. More particularly, the present invention relates to a method of oxidizing solutions of anthrahydroquinone and/or one or more substituted anthrahydroquinones or other suitable organic compounds dissolved in an inorganic or organic solvent for anthraquinones and/or one or more substituted anthraquinones in a cyclic process for producing hydrogen peroxide.

In one cyclic process utilized for the production of hydrogen peroxide an alkylated anthraquinone in an organic solvent is hydrogenated in a hydrogenator in the presence of a catalyst to form the corresponding anthrahydroquinone which, after separation (for example by filtration) of the catalyst, is oxidized to produce hydrogen peroxide with regeneration of the alkylated anthraquinone. The resultant alkylated anthraquinone solution is then recycled to the hydrogenator after removal of the hydrogen peroxide by aqueous extraction. It will be appreciated that instead of an alkylated anthraquinone, other suitable substituted anthraquinones can be employed or even anthraquinone itself, and the term "anthraquinone" is employed herein to include all these compounds. However, whichever anthraquinone is or are chosen, no alteration is required in the steps of the kind of cyclic process hereinabove described.

According to the present invention, there is provided in a cyclic process of the kind hereinabove referred to an improvement in the oxidation step which involves feeding the solution from the hydrogenator stagewise through a series of two or more reaction compartments or reaction vessels and feeding into the solution in each of said compartments or vessels the gaseous oxidizing agent or reactant in a quantity which is preferably at least that theoretically required for the oxidation in that compartment or vessel of the anthraquinone fed thereto.

The oxidizing gas can be one or more of air, oxygen or oxygen-enriched air. Preferably, the compartments or vessels are aligned substantially horizontally. If desired, when separate oxidation vessels are employed, the oxidized solution issuing from each vessel is passed through a corresponding degassing zone before being passed to the next oxidation vessel. It is preferred always to pass the oxidized solution from the last vessel through a degassing stage. The degassing stage can be conducted either in a separate vessel or in a suitable region of the oxidation vessel itself.

It is also advantageous to feed the oxidant gas to the solution by bubbling it into the solution at each stage through a suitably apertured ring, for example, a sparge ring. Advantageously too, the feed of the oxidant gas to each stage is individually metered, and the gas is employed in at least 100% quantities of that theoretically required for the oxidation of the solution contained in each stage thereby providing in each stage sufficient oxidizing gas to oxidize said solution completely at each stage.

For a more complete understanding of the invention, reference is made to the accompanying drawing in which there is shown a suitable oxidation vessel 1.

The oxidation vessel 1 is provided with an inlet 2 for the introduction of the anthrahydroquinone liquid which is pumped through the line 3 by means of pump 4. The oxidation vessel 1 is provided with several partitions or baffles 5, 6 and 7. Baffles 5 and 7 are provided with a plurality of openings 8 and 9 respectively, located in the bottom of each of the partitions. A plurality of openings 10 are provided in the upper portion of the partition 6. Located in each compartment formed by these partitions or baffles is a common manifold or gas duct 12 for the introduction of an oxidizing gas. The manifold 12 traverses each compartment and in each compartment is located an individually controlled gas valve. These valves are designated 13, 14, 15 and 16. Each valve has associated therewith a small tube such as tube 17 associated with valve 13 for the transfer of gas from the manifold 12 to the associated sparge ring 18. The sparge ring is composed of a ring of metal having a plurality of openings therein depicted by the arrows 19 shown in the drawing. At the end of the oxidation vessel opposite the inlet opening is an outlet opening 20 for the discharge of liquid introduced into the vessel.

In the use of the above equipment, the solution of hydrogenated compound from a hydrogenator is pumped into the inlet 2 utilizing pump 4 and conduit 3. The material entering the first reaction vessel or zone is oxidized by air being bubbled through the manifold 12 and by manipulation of valve 13 through conduit 17, sparge ring 18 and the openings 19 located therein. The air introduced through the openings 19 is bubbled up through the solution as it travels through the initial compartment. The solution in the first compartment is transported into the second compartment through openings 8 located in the bottom of baffle plate 5. The solution as it enters the second compartment is oxidized by the introduction of oxygen through manifold 12, valve 14, conduit 22, sparge ring 23 and openings 24. After oxidation in the second compartment the liquid passes upwardly and through openings 10 in the baffle plate 6 located between the second compartment and the third compartment. The liquid is then introduced through this opening 10 into the third compartment where it is oxidized further by passage of the oxygen containing gas from the manifold 12 by manipulation of valve 15 through conduit 26, sparge ring 27 and openings 28 located therein.

After having been suitably oxidized in this compartment of the oxidation vessel the solution passes through openings 9 located in the bottom portion of the baffle plate 7. The solution then enters the last compartment of the oxidizing vessel where it is oxidized with an oxygen containing gas by manipulation of valve 16 at the end of the manifold 12. The oxygen containing gas passes through conduit 32, the sparge ring 31 and the openings 32 located therein. The completely oxidized solution is then passed upwardly through outlet 20 and after discharge is suitably degassed.

Care must be taken in passage of the liquid through the oxidizing vessel to insure that the rates of feed and the rates of withdrawal of solution are such that the height of the solution in each compartment is less than the height of the baffle plates so that uncontrolled overspilling from one compartment to the other is avoided. Operating in this manner, and by analyzing the solution from time to time, as it passes through each compartment, a rapid accurate control of the extent of oxidation in each compartment can be maintained.

The oxidation as above described results in the production of hydrogen peroxide, and this peroxide remains dissolved in the solution passing from the outlet 20 of the oxidizing vessel. The hydrogen peroxide containing solution is then fed through a degasser which may either be separate from or can be if desired, incorporated into the oxidizer itself. The separation of the hydrogen peroxide from the hydrogen peroxide containing solution is accomplished in a conventional manner.

Located in the upper portion of the oxidizing vessel is a vent 35 for the discharge of excess oxygen. While not shown in the drawing, if desired, gas escaping from the oxidation compartments of the oxidation vessel may be de-misted by providing a blanket of suitably gas-porous material over the individual compartments formed by the baffles whereby the gas is freed from any entrained liquid, prior to its passage through vent 35. In this manner, any liquid entrained with the gas drops back into the compartment from which it escapes. Alternatively de-misting can be conducted in an apparatus separate from the oxidizer. In this case gas escaping from the oxidizing chamber through the vent 35 may be de-misted in a vessel separate from the oxidizer and this solution returned to the oxidizer through inlet 2.

For a given rate of flow of a given feed solution at a definite temperature, it is possible to calculate theoretically the amount of oxidation which will be accomplished in each compartment of the oxidizer for a given oxygen partial pressure. In practice at each stage, there is normally employed an excess of air over that theoretically required for the oxidation in that stage thereby providing in each stage sufficient oxidizing gas to oxidize said solution completely at each stage. The excess will normally be in the order of 100% or more, but may be several times that figure if desired. It may be desirable on occasion to use less than the theoretical figure, if so, quantities usually on the order of 0.7% of theoretical are utilized. Factors which increase efficiency of oxidation are agitation of the solution in the compartments, decrease in the escape aperture size of the oxygen gas pipe, and increases in temperature. Because of the latter, the oxidizers according to the present invention may be advantageously provided with a steam or hot water jacket or some other suitable heating means to provide sufficient heat to increase the rate of oxidation occurring in the various compartments of the oxidizer itself.

Although the oxidizer described in the example above is in effect a single unit, divided into a multiplicity of compartment, it will be appreciated that there may be employed several such compartmented units which are set side by side and physically separated from each other. Each unit in such a case would have a feed inlet and feed outlet and means for permitting a metered supply of oxygen gas to be released within each compartment. Conveniently the oxidizing gas can be dispersed by means of a sparge ring or other similar dispersion apparatus.

Similarly if desired, the oxidizing feeds to the various chambers or vessels used in the oxidizer may be fed from individual gas units rather than being fed from a common duct or manifold as shown in the drawing. So long as individual contact of the gas feed to each chamber or vessel is provided for, the advantages of the novel oxidizing method of the instant invention will be realized.

One important advantage accruing from the process such as described in accordance with the present invention, is that a staged gas-liquid reaction can be conducted at low gas compression costs. This advantage is especially marked in those cases where the reaction is a slow one and several or many stages are required to achieve an acceptable degree of reaction. The oxidation reaction referred to in the example, that is, for the oxidation of hydrogenated anthraquinones, is one such slow reaction, and the advantage of the present invention is of course its applicability to a cyclic operation for the production of hydrogen peroxide.

While the invention has been described with reference to certain specific embodiments, it is not intended that it be so limited except insofar as appears in the accompanying claims.

We claim:

1. In a cyclic process for the manufacture of hydrogen peroxide involving the alternate hydrogenation and oxidation of organic solutions containing anthraquinones and anthrahydroquinones, the improvement comprising conducting the oxidation of said solutions in incremental stages and oxidizing said solutions in each of said incremental stages by providing in each stage sufficient oxidizing gas to oxidize said solution completely at each stage, and recovering hydrogen peroxide from said oxidized organic solutions.

2. In a cyclic process for the manufacture of hydrogen peroxide involving the alternate hydrogenation and oxidation of organic solutions containing anthraquinones and anthrahydroquinones, the improvement comprising introducing said solutions into an oxidizing vessel separated into a plurality of gas contact zones, passing said solutions through each of said plurality of gas contact zones, oxidizing said solutions in each of said gas contact zones by regulating the feed to each gas contact zone to provide sufficient oxygen therein to substantially completely oxidize the solution passing through said zone and recovering hydrogen peroxide from said oxidized solution.

3. In a cyclic process for the manufacture of hydrogen peroxide involving the alternate hydrogenation and oxidation of organic solutions containing anthraquinones and anthrahydroquinones, the improvement comprising passing said solutions through a plurality of oxidizing zones, oxidizing the solutions in each of said oxidizing zones by introducing oxygen into the solutions in each of said oxidizing zones while regulating the quantity of oxygen fed in each of said zones to provide sufficient oxygen to oxidize the solution present in each zone completely, agitating the solution during its passage through said zone and recovering hydrogen peroxide from said oxidized solution.

4. In a cyclic process for the manufacture of hydrogen peroxide involving the alternate hydrogenation and oxidation of organic solutions containing anthraquinones and anthrahydroquinones, the improvement comprising oxidizing said solutions in series and with agitation through a plurality of oxidizing zones by introducing oxygen into said solutions during passage through said oxidizing zones, said oxygen used in each said zone being regulated to provide sufficient oxygen to completely oxidize said solutions in each of said zones, agitating said solutions by passing said solutions through said zones in a tortuous path while bubbling said oxygen through said solutions and recovering hydrogen peroxide from said oxidized solutions.

5. In a cyclic process for the manufacture of hydrogen peroxide involving the alternate hydrogenation and oxidation of organic solutions of anthraquinones and anthrahydroquinones, the improvement comprising oxidizing said solutions by (1) passing said solutions in series through a plurality of oxidizing zones, (2) mildly agitating said solutions by imparting to said solutions during passage through said zones sufficient change of direction to cause mild agitation, (3) oxidizing said solutions in each of said zones by introducing oxygen into said solutions in each of said oxidizing zones by bubbling oxygen therethrough and regulating the quantity of oxygen fed in each of said oxidizing zones to provide oxygen in a quantity sufficient to oxidize said solutions completely in each of said zones, and (4) recovering hydrogen peroxide from said oxidized solutions.

References Cited

UNITED STATES PATENTS 1,872,956   8/1932   Jaeger et al. _____ 260—687
2,158,525   5/1939   Riedl et al. _____ 23—207

OSCAR R. VERTIZ, *Primary Examiner.*

O. F. CRUTCHFIELD, *Assistant Examiner.*